(12) United States Patent
Gyllensten et al.

(10) Patent No.: US 11,735,966 B2
(45) Date of Patent: Aug. 22, 2023

(54) SURFACE-MOUNTED HIGH-SPEED PERMANENT MAGNET SYNCHRONOUS ROTOR

(71) Applicants: WOLONG ELECTRIC GROUP CO., LTD., Zhejiang (CN); ZHEJIANG LONGCHUANG MOTOR TECHNOLOGY INNOVATION CO., LTD., Zhejiang (CN); WOLONG ELECTRIC (SHANGHAI) CENTRAL RESEARCH INSTITUTE CO., LTD., Shanghai (CN)

(72) Inventors: Freddy Gyllensten, Zhejiang (CN); Youyao Du, Zhejiang (CN); George Gao, Zhejiang (CN); Yue Gao, Zhejiang (CN); Lijun Liu, Zhejiang (CN); Chunzhi Deng, Zhejiang (CN); Bin Lu, Zhejiang (CN); Zhongqi Liu, Zhejiang (CN)

(73) Assignees: WOLONG ELECTRIC GROUP CO., LTD., Zhejiang (CN); ZHEJIANG LONGCHAUNG MOTOR TECHNOLOGY INNOVATION CO., LTD., Zhejiang (CN); WOLONG ELECTRIC (SHANGHAI) CENTRAL RESEARCH INSTITUTE CO., LTD., Shanghai (CN)

( * ) Notice: Subject to any disclaimer, the term of this patent is extended or adjusted under 35 U.S.C. 154(b) by 44 days.

(21) Appl. No.: 17/246,647

(22) Filed: May 2, 2021

(65) Prior Publication Data
US 2022/0209599 A1   Jun. 30, 2022

(30) Foreign Application Priority Data

Dec. 30, 2020   (CN) .......................... 202011622726.0
Dec. 30, 2020   (CN) .......................... 202023334034.4

(51) Int. Cl.
H02K 1/27   (2022.01)
H02K 1/28   (2006.01)
(Continued)

(52) U.S. Cl.
CPC ............... *H02K 1/278* (2013.01); *H02K 1/28* (2013.01); *H02K 21/14* (2013.01); *H02K 2201/03* (2013.01)

(58) Field of Classification Search
CPC .......... H02K 1/278; H02K 1/28; H02K 21/14; H02K 2201/03
See application file for complete search history.

(56) References Cited

U.S. PATENT DOCUMENTS 4,933,583 A * 6/1990 Ripplinger ............ F16F 15/322
                                              310/216.116
6,750,580 B2 * 6/2004 Lai ........................ H02K 1/278
                                              310/156.28

(Continued)

*Primary Examiner* — Thomas Truong
(74) *Attorney, Agent, or Firm* — Yue (Robert) Xu; Apex Attorneys at Law, LLP

(57) ABSTRACT

A surface-mounted high-speed permanent magnet synchronous rotor includes a rotor shaft, multiple permanent magnet sets, multiple silicon steel piece sets and a rotor iron core sleeve. The multiple permanent magnet sets and the multiple silicon steel piece sets are glued on a surface of the rotor shaft along an axis of the rotor shaft. The multiple permanent magnet sets and the multiple silicon steel piece sets are spaced around the rotor shaft. The multiple permanent magnet sets have a same outer diameter as the multiple silicon steel piece sets, and the multiple permanent magnet sets and the multiple silicon steel piece sets are sleeved with the rotor iron core sleeve.

7 Claims, 3 Drawing Sheets

(51) Int. Cl.
*H02K 1/278* (2022.01)
*H02K 21/14* (2006.01)

(56) References Cited

U.S. PATENT DOCUMENTS

2003/0117032 A1* 6/2003 Komuro ................. H02K 1/278
310/156.08
2016/0111926 A1* 4/2016 Arimatsu ................. H02K 1/28
310/156.31

* cited by examiner

SURFACE-MOUNTED HIGH-SPEED PERMANENT MAGNET SYNCHRONOUS ROTOR

CROSS REFERENCE TO RELATED APPLICATION

The present application claims the priority to Chinese Patent Application No. 202011622726.0, titled "SURFACE-MOUNTED HIGH-SPEED PERMANENT MAGNET SYNCHRONOUS ROTOR", filed on Dec. 30, 2020 with the China National Intellectual Property Administration, and the priority to Chinese Patent Application No. 202023334034.4, titled "SURFACE-MOUNTED HIGH-SPEED PERMANENT MAGNET SYNCHRONOUS ROTOR", filed on Dec. 30, 2020 with the China National Intellectual Property Administration, which are incorporated herein by reference in their entireties.

FIELD

The present disclosure relates to the technical field of high-speed permanent magnet electric motors/generators, and in particular to a surface-mounted high-speed permanent magnet synchronous rotor.

BACKGROUND

In order to meet the market demand for efficient, power-dense drivetrains for industrial and commercial applications, high-speed permanent magnet electric motors and generators are required. The high-speed permanent magnet electric motor has advantages of high power density, small size, high efficiency, and thus becomes an important development trend for high-speed electric motor and research hotspot in the field of high-speed electric motors.

The high-speed permanent magnet electric motor or generator should meet the requirements of high-speed and constant power in a wide speed range in some fields, such as electric vehicle drivetrains, experiment test platforms, rail transits and gearless applications. High-speed is commonly defined by the peripheral speed exceeding 100 m/s. A constant power in a wide speed range means that the available power of the electric motor or generator keep unchanged from rated to the maximum rotational speed. This type of electric motor or generator have a wide range of rotational speed, and typical for gearless applications.

In the conventional technology, the interior permanent magnet synchronous electric motor or generator widely used as the drivetrain of electric vehicle can meet the requirement of constant power in a wide speed range. However, the interior permanent magnet synchronous electric motor or generator cannot meet the requirements of high-speed because the strength of electrical steel lamination (one of the components of its rotor) cannot meet the safety requirements with the high-speed induced centrifuge force.

A surface-mounted high-speed permanent magnet synchronous electric motor or generator can meet the requirement of high rotational speed due to its high strength non-magnetic alloy sleeve/composite sleeve which counteracts the centrifugal force of permanent magnets.

The surface-mounted high-speed permanent magnet synchronous rotor commonly includes a shaft, permanent magnets, and a sleeve. The shaft decides the bending stiffness and critical speed of the rotor. Rare earth permanent magnets typically have poorer mechanical properties than the other elements of the rotor and cannot be used as load bearing elements in the rotor design. The sleeve is to counteract the centrifuge force of permanent magnets at high rotational speed.

Currently, there are mainly the following two types of commonly used surface-mounted high-speed permanent magnet synchronous rotors.

As shown in FIG. 1, the first type of surface-mounted high-speed permanent magnet synchronous rotor includes cylindrical rotor shaft 1 without reinforcing ribs, permanent magnets 2 and rotor iron core sleeve 4. The advantage of this rotor is that there is no stress concentration on the rotor iron core sleeve 4 because the deformation of cylindrical rotor shaft 1 and permanent magnet 2 will deform uniformly under pre-tension force, rotational speed and thermal expansion, while the disadvantage of this rotor is the weak flux-weakening behavior and it cannot meet the requirements of constant power in a wide speed range.

As shown in FIG. 2, the second type of surface-mounted high-speed permanent magnet synchronous rotor includes cylindrical rotor shaft 1 with reinforcing ribs, permanent magnets 2 and rotor iron core sleeve 4. The advantage of this rotor is the reinforcing ribs on cylindrical rotor shaft 1 improve the bending stiffness and the critical speed of rotor, furthermore reduce the length of rotor. Further, the reinforcing ribs form a reluctance torque. Therefore this type of rotor can meet the requirements of constant power in a wide speed range. The disadvantage of this rotor is there is serious stress concentration on the rotor iron core sleeve 4 because the deformation of cylindrical rotor shaft 1 and permanent magnet 2 will not deform uniformly under pre-tension force, rotational speed and thermal expansion due to the elastic modulus and thermal expansion coefficients are different.

Therefore, an urgent problem for those skilled in the art is to develop a surface-mounted high-speed permanent magnet synchronous rotor for electric motor or generator which can meet the requirements of constant power in a wide speed range and decrease the level of stress concentration on the rotor iron core sleeve.

SUMMARY

A surface-mounted high-speed permanent magnet synchronous rotor is provided according to the present disclosure, which meets requirements of both high rotational speed and constant power in a wide speed range, and decrease the level of stress concentration on the rotor iron core sleeve.

In order to solve the above technical problems, the following technical solutions are provided according to the present disclosure.

A surface-mounted high-speed permanent magnet synchronous rotor includes a rotor shaft, multiple permanent magnet sets, multiple silicon steel piece sets and a rotor iron core sleeve. The multiple permanent magnet sets and the multiple silicon steel piece sets are glued on a surface of the rotor shaft along an axis of the rotor shaft. The multiple permanent magnet sets and the multiple silicon steel piece sets are spaced around the rotor shaft. The multiple permanent magnet sets have a same outer diameter as the multiple silicon steel piece sets. The multiple permanent magnet sets and the multiple silicon steel piece sets are sleeved with the rotor iron core sleeve.

In an embodiment, the rotor iron core sleeve is a non-ferromagnetic metal sleeve. The multiple permanent magnet sets and the multiple silicon steel piece sets in an interference fit with the rotor iron core sleeve.

In an embodiment, the rotor iron core sleeve is a composite sleeve formed by winding yarns of composite material around the multiple permanent magnet sets and the multiple silicon steel piece sets under a pre-tension force.

In an embodiment, the composite sleeve is made of resin and reinforcing fiber.

In an embodiment, the resin is epoxy resin, phenolic resin, polytetrafluoroethylene, polyimide, bismaleimide, cyanate ester, benzoxazine or cyano resin, and the reinforcing fiber is carbon fiber, Kevlar fiber or glass fiber.

In an embodiment, an interface between each of the multiple permanent magnet sets and the rotor shaft is a plane or an arc-shaped curved surface, and an interface between each of the multiple silicon steel piece sets and the rotor shaft is a plane or an arc-shaped curved surface.

In an embodiment, the number of the silicon steel piece sets is 2n, and n is a natural number.

The surface-mounted high-speed permanent magnet synchronous rotor according to the present disclosure includes a rotor shaft, multiple permanent magnet sets, multiple silicon steel piece sets and a rotor iron core sleeve. Each of the multiple permanent magnet sets includes multiple permanent magnets successively connected end to end along an axis of the rotor shaft. Each of the multiple silicon steel piece sets includes multiple silicon steel pieces successively stacked along the axis of the rotor shaft. The rotor shaft is a cylindrical smooth shaft. The multiple permanent magnet sets and the multiple silicon steel piece sets are glued on a surface of the rotor shaft along the axis of the rotor shaft. The multiple permanent magnet sets and the multiple silicon steel piece sets have a same axis as the rotor shaft. The multiple permanent magnet sets and the multiple silicon steel piece sets are spaced around the rotor shaft. Two side surfaces of a silicon steel piece set are bonded to side surfaces of two permanent magnet sets between which the silicon steel piece set is arranged. The multiple permanent magnet sets have a same outer diameter as the multiple silicon steel piece sets. The multiple permanent magnet sets and the multiple silicon steel piece sets are sleeved with the rotor iron core sleeve. The multiple permanent magnet sets and the multiple silicon steel piece sets are protected by the rotor iron core sleeve.

According to the technical solutions in the embodiments of the present disclosure, the high-speed permanent magnet synchronous rotor has a surface-mounted structure, and the multiple silicon steel piece sets are added to the high-speed permanent magnet synchronous rotor. The multiple silicon steel piece sets form a reluctance torque. Therefore this type of rotor can meet the requirements of constant power in a wide speed range. The silicon steel piece sets are non-rigidly connected to the rotor shaft, so that the silicon steel piece sets deform uniformly under pre-tension force, rotational speed and thermal expansion, and there is no stress concentration on the rotor iron core sleeve. In view of the foregoing, the surface-mounted high-speed permanent magnet synchronous rotor according to the present disclosure can meet the requirements of high rotational speed and constant power in a wide speed range, which has great improvement for design of the high-speed permanent magnet electric motor rotor in drivetrains of electric vehicle, experiment test platform, rail transit and the like.

BRIEF DESCRIPTION OF THE DRAWINGS

In order to illustrate technical solutions in embodiments of the present disclosure or in the conventional technology much more clearly, drawings to be used in the description of the embodiments or the conventional technology are introduced simply hereinafter. It is apparent that the drawings described below show only some embodiments of the present disclosure. For those skilled in the art, other drawings may be obtained based on the provided drawings without any creative work.

Figure 1:
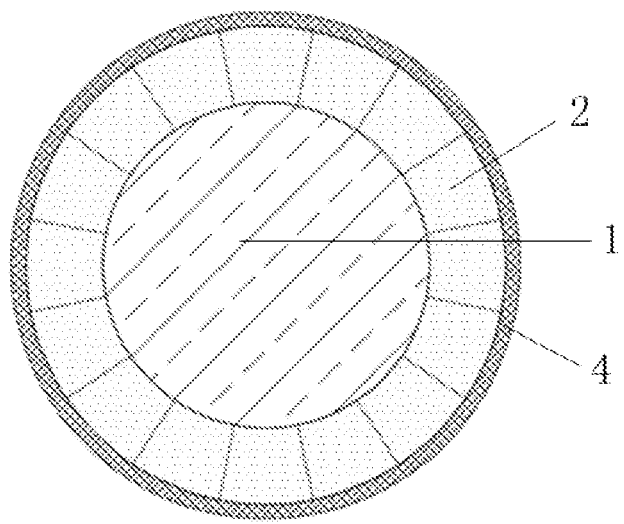
FIG. 1 is a schematic diagram showing a cross section of an iron core of the first type of surface-mounted high-speed permanent magnet synchronous rotor according to the conventional technology.
Figure 2:
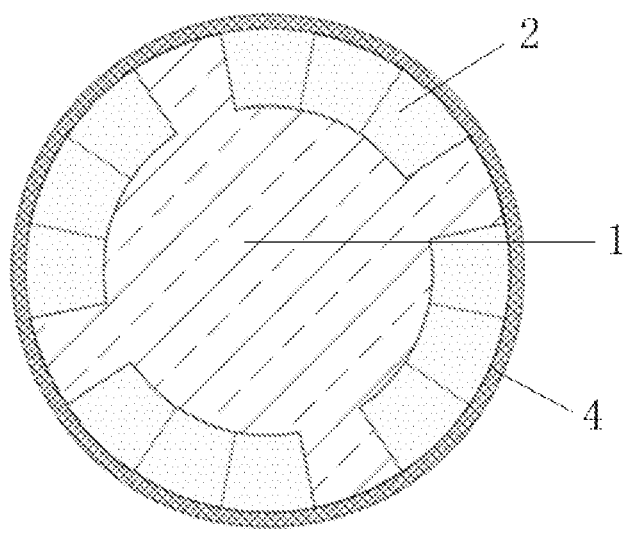
FIG. 2 is a schematic diagram showing a cross section of an iron core of the second type of surface-mounted high-speed permanent magnet synchronous rotor according to the conventional technology.

Reference numerals in the drawings are listed as follows:

| 1 rotor shaft, | 2 permanent magnet set, |
| 3 silicon steel piece set, | 4 rotor iron core sleeve. |

DETAILED DESCRIPTION

A surface-mounted high-speed permanent magnet synchronous rotor is provided according to the present disclosure, which meets requirements of both high rotational speed and constant power in a wide speed range, and a rotor iron core sleeve of the rotor has no stress concentration.

The technical solutions in the embodiments of the present disclosure are described clearly and completely in conjunction with the drawings in the embodiments of the disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

Figure 3:
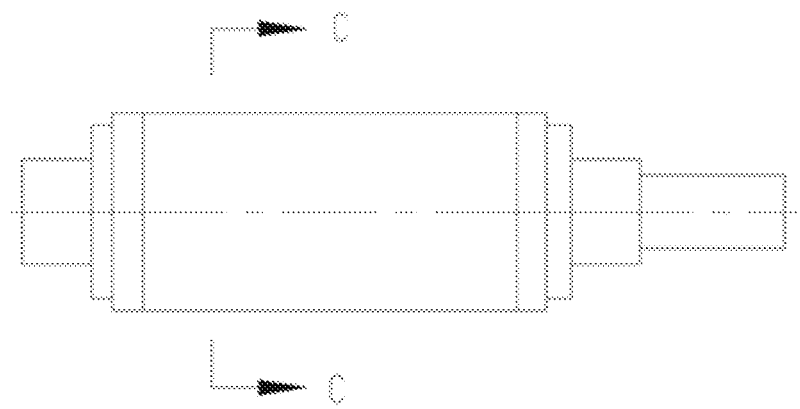
FIG. 3 is a schematic structural diagram of a surface-mounted high-speed permanent magnet synchronous rotor according to an embodiment of the present disclosure.
Figure 4:
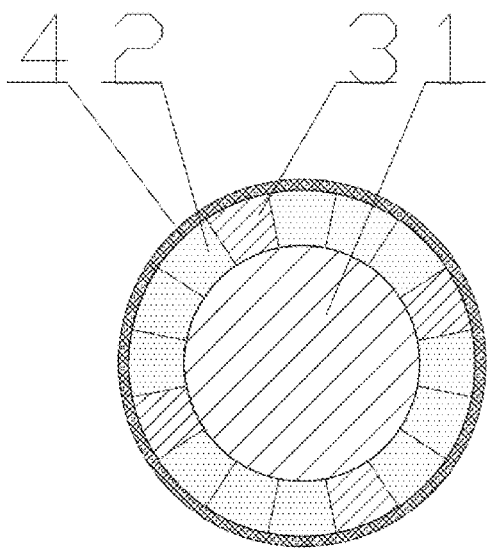
FIG. 4 is a schematic diagram showing a cross section of the surface-mounted high-speed permanent magnet synchronous rotor shown in FIG. 3 along a direction indicated by C-C.
Figure 5:
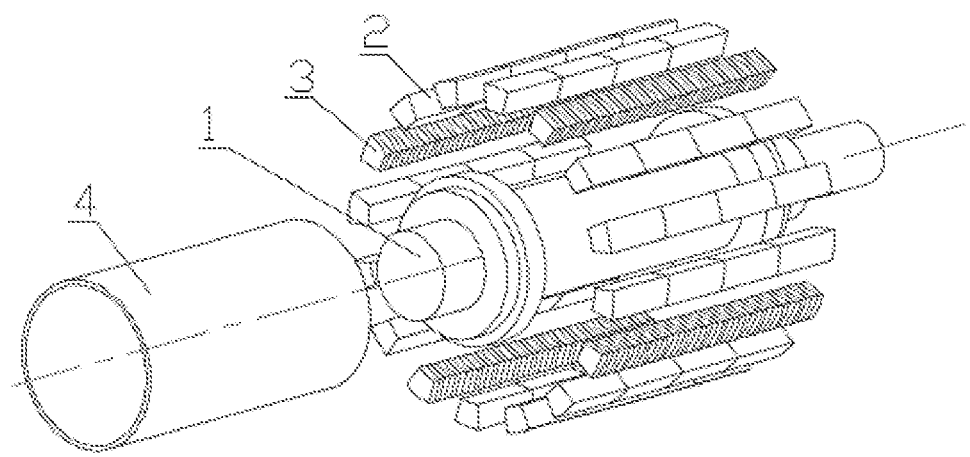
FIG. 5 is an exploded view of a surface-mounted high-speed permanent magnet synchronous rotor.

Referring to FIGS. 3 to 5, FIG. 3 is a schematic structural diagram of a surface-mounted high-speed permanent magnet synchronous rotor according to an embodiment of the present disclosure. FIG. 4 is a schematic diagram showing a cross section of the surface-mounted high-speed permanent magnet synchronous rotor shown in FIG. 3 along a direction indicated by C-C. FIG. 5 is an exploded view of a surface-mounted high-speed permanent magnet synchronous rotor.

In an embodiment, a surface-mounted high-speed permanent magnet synchronous rotor according to the present disclosure includes a rotor shaft 1, multiple permanent magnet sets 2, multiple silicon steel piece sets 3 and a rotor iron core sleeve 4. The multiple permanent magnet sets 2 and the multiple silicon steel piece sets 3 are glued on a surface of the rotor shaft 1 along an axis of the rotor shaft 1. The multiple permanent magnet sets 2 and the multiple silicon steel piece sets 3 are spaced around the rotor shaft 1. The permanent magnet set 2 has a same outer diameter as the silicon steel piece set 3. The multiple permanent magnet sets 2 and the multiple silicon steel piece sets 3 are sleeved with the rotor iron core sleeve 4.

In the above embodiment, the surface-mounted high-speed permanent magnet synchronous rotor includes the rotor shaft 1, the multiple permanent magnet sets 2, the multiple silicon steel piece sets 3 and the rotor iron core sleeve 4. Parameters such as dimensions and strength of the rotor shaft 1, the permanent magnet set 2, the silicon steel piece set 3 and the rotor iron core sleeve 4 meet operation requirements of a high-speed permanent magnet electric motor or generator.

Each of the multiple permanent magnet sets 2 includes multiple permanent magnets that are sequentially connected together along the axis of the rotor shaft 1. Each of the multiple silicon steel piece sets 3 includes multiple silicon steel pieces that are sequentially stacked along the axis of the rotor shaft 1.

The rotor shaft 1 is a cylindrical smooth shaft. The multiple permanent magnet sets 2 and the multiple silicon steel piece sets 3 are glued on the surface of the rotor shaft 1 along the axis of the rotor shaft 1. The multiple permanent magnet sets 2 and the multiple silicon steel piece sets 3 have a same axis as the rotor shaft 1.

In an embodiment, the multiple permanent magnet sets 2 and the multiple silicon steel piece sets 3 are glued on the surface of the rotor shaft 1 by glue, which is convenient for connection, easy for operation, strong for gluing and not easy to loosen. Further, a side surface of the permanent magnet set 2 is bonded to a side surface of the silicon steel piece set 3 by glue, so that the rotor shaft 1, the multiple silicon steel piece sets 3 and the multiple permanent magnet sets 2 are bonded together as a whole, thereby enhancing bonding strength of the rotor. In a case that a silicon steel piece set 3 or a permanent magnet set 2 is separated from the rotor shaft 1, the separated silicon steel piece set 3 or the separated permanent magnet set 2 is still bonded to a permanent magnet set 2 or a silicon steel piece set 3 adjacent to the separated silicon steel piece set 3 or the separated permanent magnet set 2. Therefore, the separated silicon steel piece set 3 or the separated permanent magnet set 2 is not away from the rotor shaft 1.

The multiple permanent magnet sets 2 and the multiple silicon steel piece sets 3 are spaced around the rotor shaft 1. That is, a silicon steel piece set 3 is arranged between two permanent magnet sets 2. Two side surfaces of the silicon steel piece set 3 are bonded to side surfaces of two permanent magnet sets 2 between which the silicon steel piece set 3 is arranged.

After being glued on the surface of the rotor shaft 1, the multiple permanent magnet sets 2 and the multiple silicon steel piece sets 3 are pressed by fastening pieces at two ends of an iron core of the rotor, such that the multiple permanent magnet sets 2 and the multiple silicon steel piece sets 3 are fixed. In an embodiment, the fastening pieces are made of steel, which has high strength and low cost.

The permanent magnet set 2 has a same outer diameter as the silicon steel piece set 3. The multiple permanent magnet sets 2 and the multiple silicon steel piece sets 3 are sleeved with the rotor iron core sleeve 4. The multiple permanent magnet sets 2 and the multiple silicon steel piece sets 3 are protected by the rotor iron core sleeve 4.

According to the technical solutions in the embodiments of the present disclosure, the high-speed permanent magnet synchronous rotor has a surface-mounted structure, and the silicon steel piece sets 3 are added to the high-speed permanent magnet synchronous rotor. The multiple silicon steel piece sets form a reluctance torque. Therefore this type of rotor can meet the requirements of constant power in a wide speed range. The silicon steel piece sets 3 are non-rigidly connected to the rotor shaft 1, so that the silicon steel piece sets 3 deform uniformly under the pre-tension force, rotational speed and thermal expansion, and the rotor iron core sleeve 4 has no stress concentration. In view of the foregoing, the surface-mounted high-speed permanent magnet synchronous rotor according to the present disclosure can meet the requirements of high rotational speed, and constant power in a wide speed range, which has great significance for design of the high-speed permanent magnet electric motor rotor in drivetrains of electric vehicle, an experiment test platform, rail transit and the like.

For the rotor iron core sleeve 4, there are at least two alternative solutions. In an embodiment, the rotor iron core sleeve 4 is a metal sleeve, such as a non-magnetic alloy sleeve, which may be made of titanium alloy and nickel chromium alloy and has high strength and corrosion resistance, to meet performance requirements of the surface-mounted high-speed permanent magnet synchronous rotor. The permanent magnet sets 2 and the silicon steel piece sets 3 are in an interference fit with the metal sleeve. The permanent magnet sets 2 and the silicon steel piece sets 3 are assembled with the metal sleeve by a shrink fit process, and thus have a high connection strength.

In another embodiment, the rotor iron core sleeve 4 is a composite sleeve. The composite sleeve is wound around the multiple permanent magnet sets 2 and the multiple silicon steel piece sets 3 under the pre-tension force of single yarn/prepreg, which is convenience for connection.

The composite sleeve is made of resin and reinforcing fiber. The resin may be epoxy resin, phenolic resin, polytetrafluoroethylene, polyimide, bismaleimide, cyanate ester, benzoxazine or cyano resin. The reinforcing fiber may be carbon fiber, Kevlar fiber or glass fiber. The resin and the reinforcing fiber may be randomly combined, and have many combinations, which all fall within the protection scope of the present disclosure.

To further optimize the above technical solutions, those skilled in the art can make some changes to the above embodiments according to different situations. An interface between each permanent magnet set 2 and the rotor shaft 1, and an interface between each silicon steel piece set 3 and the rotor shaft 1 may be a plane or an arc-shaped curved surface, to meet different electromagnetic properties for a wide range of applications.

Based on the above embodiments, the number of the silicon steel piece sets 3 is 2n, and n is a natural number. The silicon steel piece sets 3 are uniformly arranged and distributed symmetrically around the axis of the rotor shaft 1. It should be noted that a proportion of the permanent magnet sets 2 is greater than a proportion of the silicon steel piece sets 3 around the rotor shaft 1. For example, three permanent magnet sets 2 and one silicon steel piece set 3 are arranged to meet the performance requirements of the surface-mounted high-speed permanent magnet synchronous rotor. The number and the proportion of the permanent magnet sets 2 and the number and the proportion of the silicon steel piece sets 3 are not limited, and may be determined according to the actual requirements.

The embodiments in this specification are described in a progressive way, each of which emphasizes the differences from others, and the same or similar parts among the embodiments can be referred to each other.

The surface-mounted high-speed permanent magnet synchronous rotor according to the present disclosure is described above in detail. Specific embodiments are used herein to illustrate the principle and implementation of the present disclosure, and are only used to help understand the method and concept of the present disclosure. It should be noted that, those skilled in the art can still improve or modify the present disclosure without departing from the principle of the present disclosure, and such improvements and modifications also fall within the protection scope of the claims of the present disclosure. Therefore, the present disclosure is not limited to the embodiments illustrated herein, but should be defined by the widest scope consistent with the principle and novel features disclosed herein.

The invention claimed is:

1. A surface-mounted high-speed permanent magnet synchronous rotor, comprising a rotor shaft, a plurality of permanent magnet sets, a plurality of silicon steel piece sets and a rotor iron core sleeve, wherein
   the plurality of permanent magnet sets and the plurality of silicon steel piece sets are glued on a surface of the rotor shaft along an axis of the rotor shaft;
   the plurality of permanent magnet sets and the plurality of silicon steel piece sets are spaced around the rotor shaft;
   the plurality of permanent magnet sets have a same outer diameter as the plurality of silicon steel piece sets; and
   the plurality of permanent magnet sets and the plurality of silicon steel piece sets are sleeved with the rotor iron core sleeve, and a proportion of the permanent magnet sets is greater than a proportion of the silicon steel piece sets around the rotor shaft.

2. The surface-mounted high-speed permanent magnet synchronous rotor according to claim 1, wherein the rotor iron core sleeve is a non-ferromagnetic metal sleeve, and the plurality of permanent magnet sets and the plurality of silicon steel piece sets are in an interference fit with the non-ferromagnetic metal sleeve.

3. The surface-mounted high-speed permanent magnet synchronous rotor according to claim 1, wherein the rotor iron core sleeve is a composite sleeve formed by winding yarns of composite material around the plurality of permanent magnet sets and the plurality of silicon steel piece sets under a pre-tension force.

4. The surface-mounted high-speed permanent magnet synchronous rotor according to claim 3, wherein the composite sleeve is made of resin and reinforcing fiber.

5. The surface-mounted high-speed permanent magnet synchronous rotor according to claim 4, wherein the resin is epoxy resin, phenolic resin, polytetrafluoroethylene, polyimide, bismaleimide, cyanate ester, benzoxazine or cyano resin, and the reinforcing fiber is carbon fiber or glass fiber.

6. The surface-mounted high-speed permanent magnet synchronous rotor according to claim 1, wherein an interface between each of the plurality of permanent magnet sets and the rotor shaft is a plane or an arc-shaped curved surface, and an interface between each of the plurality of silicon steel piece sets and the rotor shaft is a plane or an arc-shaped curved surface.

7. The surface-mounted high-speed permanent magnet synchronous rotor according to claim 1, wherein the number of the silicon steel piece sets is 2n, and n is a natural number.

* * * * *